United States Patent Office 3,832,229
Patented Aug. 27, 1974

3,832,229
METHOD OF USING LATEX POLYMER FORMULATIONS FOR SEEPAGE CONTROL
Paul L. Du Brow, Chicago, and Alvin J. Frisque, La Grange, Ill., assignors to Nalco Chemical Company, Chicago, Ill.
No Drawing. Filed Oct. 6, 1972, Ser. No. 295,633
Int. Cl. E02b 3/00
U.S. Cl. 117—161 UA                 10 Claims

ABSTRACT OF THE DISCLOSURE

A method of seepage control which comprises contacting a surface with either: (1) water-in-oil emulsion containing dispersed throughout a finely-divided water-soluble vinyl addition polymer; or (2) a stable liquid dispersion of a water-soluble anionic vinyl addition polymer and a water-soluble cationic polymer.

INTRODUCTION

Water losses to the earth due to seepage have long been experienced. For example, irrigation ditches, feeder canals and drainage ditches lose great quantities of water to the ground before the water is used or before it reaches its point of application. Also great quantities of water are lost due to seepage in farm ponds. In addition, it is often desirable to maintain a moisture area upon a permeable surface such as roads and highways, thus preventing the seepage of moisture into the ground below.

It is a known fact that water or moisture will penetrate and be absorbed by a permeable surface. More specifically, water tends to penetrate the ground upon contact. This loss of water is experienced to a great extent in the Western, Southwestern and Southern portions of the United States where irrigation is a requirement for the growing and maintaining of any vegetable and plant life.

It would be desirable to provide a method of seepage control by which the amount of water lost through a permeable surface, i.e., the earth, could be minimized. Such a method would provide an improved method for transportation of water from both a cost and waste standpoint.

It has been discovered that this method may be effected by the application of a water-in-oil emulsion containing dispersed throughout a finely-divided water-soluble vinyl addition polymer. Of equal importance is a stable liquid dispersion of an emulsion containing anionic polymer from above and a water-soluble cationic polymer.

OBJECTS

Therefore, an object of this invention is to provide a method of seepage control which comprises contacting a surface with a water-in-oil emulsion containing dispersed throughout a finely-divided water-soluble vinyl addition polymer.

Another object of this invention is to provide a method of seepage control which comprises contacting the surface with a stable liquid dispersion of a water-soluble anionic vinyl addition polymer and a water-soluble cationic polymer.

A further object of this invention is to provide a method of seepage control for irrigation ditches, drainage ditches, farm ponds and feeder canals.

Further objects will appear hereinafter.

THE INVENTION

This invention involves a method of seepage control which comprises contacting a surface with a water-in-oil emulsion containing dispersed therethroughout a finely-divided water-soluble vinyl addition polymer. The emulsion containing polymer comprises:

(A) An aqueous phase ranging between 75 and 95% by weight of the emulsion, which is comprised of:
(1) a water-soluble vinyl addition polymer having a concentration between 20 and 50% by weight of the emulsion,
(2) water ranging between 5 and 25% by weight of the aqueous phase,
(B) A hydrophobic liquid ranging between 5 and 25% by weight of the emulsion; and
(C) A water-in-oil emulsifying agent having a concentration between 0.1 and 30% by weight of the emulsion.

In addition, this invention involves a method of seepage control which comprises contacting a surface with a stable liquid dispersion of a water-soluble anionic vinyl addition polymer and a water-soluble cationic polymer; the dispersion comprising:

(A) A polymeric latex composed of a water-in-oil emulsion which contains dispersed therein a finely-divided water-soluble anionic vinyl addition polymer, the polymeric latex having uniformly distributed therethroughout;
(B) A water-soluble cationic polymer with the weight ratio of (A):(B) being within the range of 1:10 to 10:1 and the total amount of (A)+(B) present within the dispersion being within the range of from 0.001 to 75% by weight.

THE EMULSION CONTAINING POLYMERS

In general, polymer emulsions are stable, and yet at the same time contain relatively large amounts of polymer. The polymers dispersed in the emulsion are quite stable when the particle size of the polymer is within the range of 2 millimicrons up to about 5 microns. The preferred particle size is within the range of 5 millimicrons and 3 microns.

The stable water-in-oil emulsion comprises:
(A) an aqueous phase;
(B) a hydrophobic liquid; and
(C) a water-in-oil emulsifying agent.

The polymer containing emulsion of this invention is comprised of an aqueous phase ranging between 75 and 95% by weight of the emulsion. The aqueous phase is defined as the sum of the polymer and copolymer and the water present in the composition. The preferred range is between 75 and 90% by weight of the emulsion. The most preferred range is between 80 and 85% by weight of the emulsion.

The present invention has a polymer concentration between 20 and 50% by weight of the emulsion. A preferred range is between 25 and 40% by weight of the emulsion. The most preferred range is between 30 and 35% by weight of the emulsion.

The polymers most commonly used in the application of this invention are acrylamide polymers which include polyacrylamide and its water-soluble copolymeric derivatives such as, for instance, acrylic acid, methacrylic acid, maleic anhydride, acrylonitrile, and styrene. The copolymers contain from about 5 to 95% by weight of acrylamide. The molecular weights of the polymers and copolymers generally exceed 500,000.

A polymer also used in the practice of this invention is hydrolyzed polyacrylamide which has from 1 to 50% of the original carboxamide groups hydrolyzed to carboxyl groups. The molecular weights of hydrolyzed polyacrylamides generally range from 500,000 to 1 million or more.

Other water-soluble vinyl polymers are described in detail in the following U.S. Pats.: 3,418,237; 3,259,570; and 3,171,805. In examining the disclosure of these patents it will be seen that the water-soluble polymers may be either cationic or anionic and, in some instances, the ionic charges are sufficiently slight so that the polymers may be considered nonionic. For example, water-soluble polymers and copolymers of allyl amines, diallyl amines or dimethylaminoethyl methacrylate are cationic. Polymers such as polyvinyl alcohol are nonionic and polymers such as polyacrylic acid or polystyrene sulfonates are anionic. All of these polymers may be used in the practice of this invention.

The molecular weights of the polymers described above may vary over a wide range, e.g., 10,000 to 25 million. The preferred polymer has a molecular weight in excess of 1 million.

The organic or oil phase of the emulsion is comprised of an inert hydrophobic liquid. The hydrophobic liquid comprises between 5 and 25% by weight of the emulsion. The preferred range is between 10 and 25% by weight of the emulsion. The most preferred range is between 10 and 20% by weight of the emulsion.

The oil phase used in preparing these emulsions may be selected from a large group of organic liquids which include liquid hydrocarbons and substituted liquid hydrocarbons. Preferred group of organic liquids are hydrocarbon liquids which include blends of aromatic and aliphatic hydrocarbon compounds, which contain from 4 to 8 carbon atoms. Thus, such organic hydrocarbon liquids as benzene, xylene, toluene, mineral oils, kerosenes, napthas, and in certain instances, petroleums may be used. A particularly useful oil from the standpoint of its physical and chemical properties is in the branch-chain isoparaffinic solvent sold by Humble Oil and Refinery Company under the tradename "Isopar M." Typical specifications of this narrow-cut isoparaffinic solvent are set forth below in Table I.

TABLE I

| Specification properties | Minimum | Maximum | Test method |
|---|---|---|---|
| Gravity, API at 60/60° F | 48.0 | 51.0 | ASTM D 287 |
| Color, Saybolt | 30 |  | ASTM D 156 |
| Aniline point, ° F | 185 |  | ASTM D 611 |
| Sulfur, p.p.m |  | 10 | ASTM D 1266 [1] |
| Distillation, ° F |  |  | ASTM D 86 |
| IBP | 400 | 410 |  |
| Dry point |  | 495 |  |
| Flash point, ° F.[2] | 160 |  | ASTM D 93 |

[1] Nephelometric mod.
[2] Pensky-Martens closed cup.

Any conventional water-in-oil emulsifying agent can be used such as sorbitan monostearate, sorbitan monooleate, and the so-called low HLB materials which are all documented in the literature and are summarized in the Atlas HLB Surfactant Selector. Although the mentioned emulsifiers are used in producing good water-in-oil emulsions, other surfactants may be used as long as they are capable of producing these emulsions. The water-in-oil empulsifying agent is presented in amounts ranging between 0.1 and 30% by weight of the emulsion. The preferred range is between 1.0 and 15% by weight of the emulsion. The most preferred range is between 12 and 15% by weight of the emulsion.

The water-in-oil emulsion used in the practice of this invention exhibits the unique ability of rapidly dissolving into aqueous solution. The polymer-containing emulsion releases the polymer in water in the presence of a surfactant in a very short period of time. This inversion technique is described in Anderson et al., U.S. 3,624,019. This U.S. patent is incorporated herein by reference.

Generally, the emulsion-containing polymer will be diluted with an organic liquid prior to use. In this application, the water-in-oil emulsion containing the vinyl addition polymer will be diluted with an organic liquid so that the final dispersion will have 0.001 to 10% by weight of the two polymers. Typically, the liquid organic solvent is added to the emulsion-containing polymer in the ratio of from 99:1 to 10:90, preferably 97:3 to 60:40.

The organic liquids used for this dilution include both aromatic and aliphatic hydrocarbon compounds. Thus, such organic hydrocarbon liquids as benzene, xylene, toluene, and mineral oils, kerosene, napthas and petroleums may be used.

STABLE LIQUID DISPERSION

The stable liquid dispersion is a water-soluble anionic vinyl addition polymer in the form of a water-in-oil emulsion which contains dispersed therein the finely-divided water-soluble anionic vinyl addition polymer which contains uniformly distributed therethroughout a water-soluble cationic polymer. The water-in-oil emulsion containing dispersed therein the finely-divided water-soluble anionic vinyl addition polymers are described above in the section The Emulsion Containing Polymers. The water-soluble anionic vinyl addition polymers that are used in the practice of this portion of the invention may be illustrated by the following list of polymers.

TABLE II

No.: Name
1 ---- Polyacrylic acid-sodium salt.
2 ---- Polymethacrylic acid-sodium salt.
3 ---- Maleic anhydride-vinyl acetate copolymer.
4 ---- Polyvinylmethyl ether-maleic anhydride copolymer.
5 ---- Methacrylic acid-acrylamide copolymer.
6 ---- Polyacrylic acid.
7 ---- Isopropenyl acetate - maleic anhydride sodium salt.
8 ---- Itaconic acid-vinyl acetate.
9 ---- Methyl styrene-maleic anhydride sodium salt.
10 ---- Styrene-maleic anhydride.
11 ---- Methylmethacrylate-maleic anhydride sodium salt.
12 ---- Acrylic acid-styrene.
13 ---- Acrylamide-acrylic acid (5% by weight).
14 ---- Acrylamide-acrylic acid (50% by weight).
15 ---- Polystyrene sulfonic acid.
16 ---- Acrylamide-acrylic acid (80% by weight).

The above polymers may vary in molecular weight. They may be as low as 10,000 or as high as 12,000,000 or more. In many of the more useful applications, which will be more fully discussed hereafter, the molecular weight will be greater than 1,000,000.

The invention contemplates using as preferred water-soluble anionic vinyl addition polymers the homo- and copolymers of acrylic acid as well as the water-soluble salts thereof.

THE WATER-SOLUBLE CATIONIC POLYMERS

These polymers also may be selected from a wide variety of known polymeric materials. Several of these polymers are listed below in Table III:

TABLE III

No.: Name
1 ---- Ethylene dichloride-ammonia condensation polymers.
2 ---- Tetraethylene pentamine-epichlorohydrin condensation polymers.
3 ---- Epichlorohydrin - ammonia condensation polymers.
4 ---- Polyethylene imine.
5 ---- Ethylene diamine.
6 ---- Polydiallyl amine.
7 ---- Dimethylamino ethyl methacrylate.
8 ---- The methyl chloride quaternary of Number 1.
9 ---- The benzol chloride quaternary of Number 7.
10 ---- Guanidine formaldehyde condensation polymers.
11 ---- Acrylamide-diallylamine (30%).

The above polymers are illustrative of typical water-soluble cationic polymeric materials that may be used in the practices of the invention. A preferred class of these polymers may be described as alkylene polyamines which are illustrated by polymers 1, 2, 3, 4, 5 and 8 above.

Many of the above polymers have been described with respect to the reactants from which they are prepared. A detailed discussion of the above polymers and other cationic polymers appears in Canadian Pat. No. 731,212, the disclosure of which is incorporated herein by reference. The polymers may be employed as solutions or in the form of a water-in-oil latex emulsion. When the polymers are of the vinyl addition type they may be copolymers of other ethylenically saturated monomers. Such copolymers should contain at least 5% by weight of the cationic monomer.

Once the latices containing the water-soluble anionic vinyl addition polymers are prepared as described above, the stable liquid dispersion is prepared by combining the latex containing polymer with the water-soluble cationic polymers by the utilization of conventional mixing techniques. Preferably, the water-soluble cationic polymers are in the form of aqueous solutions which contain 5 to 40% by weight of the polymer and are added to the polymeric latex. Alternatively, they may be nearly water-free After uniformly mixing the two components there results a dispersion of a water-soluble anionic vinyl addition polymer and a water-soluble cationic polymer. The proportions of the two polymers may be varied to a considerable degree. For instance, the ratio of the water-soluble anionic vinyl addition polymer to water-soluble cationic polymer may vary between 1:10 to 10:1 on a weight basis. A preferred ratio is 1:5 to 5:1. The most preferred ratio is 1:2 to 2:1.

The amount of water-soluble anionic vinyl addition polymers plus water-soluble cationic polymers present in the finished stable dispersion may be varied over a wide range of concentrations, e.g., liquid dispersions containing from 0.001 to 75% by weight are useful, although for most applications the total weight of the two polymers contained in the dispersion concentrate will be within the range of 5 to 40% by weight, with a very beneficial dispersion being one which contains between 10 to 30% by weight of the two polymers.

The finished dispersion concentrates are stable at room temperature for periods of time ranging between several days to as long as six months since they may be prepared over a wide variety of concentrations. To illustrate the preparation of stable liquid dispersions, a variety of emulsions were prepared containing different water-soluble anionic vinyl addition polymers. These emulsions are set forth below in Table IV.

weight of an ammonia ethylene dichloride polymer of the type used in Dispersion A above, with the exception it had been quaternized with methyl chloride.

To illustrate other novel dispersion concentrates of the invention Table V is presented below:

TABLE V

| Dispersion | Anionic latex, Table IV | Percent by wt. | Cationic polymer | Percent by wt. |
|---|---|---|---|---|
| C | I | 60 | 20% solution of a tetraethylene pentamine epichlorohydrin reaction product (Canadian Pat. 731,212). | 40 |
| D | VI | 50 | Ethylene diamine | 10 |
| E | V | 70 | 75% acrylamide, 25% dimethylamino ethyl methactylate copolymer in the form of a latex (water-in-oil)—See Table II, U.S. 3,624,019. | |

All of the above dispersion concentrates were stable and were capable of being stored under a variety of conditions without interreaction of the two polymers.

Generally, the stable liquid dispersion will be diluted with an organic liquid prior to use. As mentioned above, the preferred dispersion concentrate will have from 5 to 40% by weight of the two polymers. In this application, the stable liquid dispersion will be diluted with an organic liquid so that the final dispersion will have 0.001 to 10% by weight of the two polymers. Typically, the liquid organic solvent or brine water is added to the stable dispersion in the ratio of from 99:1 to 10:90, preferably 97:3 to 60:40.

The organic liquids used for this dilution include both aromatic and aliphatic hydrocarbon compounds. Thus, such organic hydrocarbon liquids as benzene, xylene, toluene, and mineral oils, kerosene, napthas and petroleums may be used.

In addition to a dilution with a liquid hydrocarbon solvent, preferably a brine water may be used for dilution purposes. Typically, the brine water consists of an aqueous solution of a water-soluble inorganic salt. Generally, the salts used are sodium chloride, sodium sulfate, sodium bromide, calcium sulfate and magnesium sulfate. The salts are not limited to those mentioned above. Any water-soluble inorganic salt may be used. The brine water concentration may have a salt content ranging from 0.1% to as high as a concentrated salt. The dispersion when diluted with the brine water is stable and is capable of being stored under a variety of conditions without interaction of the two polymers.

TABLE IV

| Composition number | Percent by wt. | | | Percent in emulsion | Polymer particle size range |
|---|---|---|---|---|---|
| | Water | Oil | Polymer | | |
| I | 72 | 28(I) | 93% acrylamide / 7% methacrylic acid | 35 | 0.05-7.0 microns. |
| II | 72 | 28(I) | 93% acrylamide / 7% methacrylic acid | 35 | Do. |
| III | 72 | 28(T) | 70% acrylamide / 30% acrylic acid | 35 | Do. |
| IV | 67 | 33(I) | 93% acrylamide / 7% methacrylic acid | 32 | <30 microns. |
| V | 70 | 30(I) | 70% acrylamide / 30% acrylic acid | 34 | .01-10 microns. |
| VI | 71 | 29(I) | Sodium polyacrylate | 37 | <1 mm. |

NOTE.—I=Isopar M; T=Toluene.

DISPERSION A

To the emulsion in Table IV, Composition Number VI, there was added 30% by weight of an aqueous dispersion containing 23% by weight of an alkylene polyamine prepared from the condensation of ethylene dichloride and ammonia. The polymer was prepared using the techniques set forth in Canadian Pat. No. 785,829.

DISPERSION CONCENTRATE B

To composition Number VI in Table IV, there was added an aqueous dispersion which contained 25% by

THE METHOD

A surfactant may be added to the diluted emulsion-containing polymer of the diluted stable dispersion as the case may be. However, generally a surfactant is not added. The concentration of the surfactant added may vary over a wide range, preferably from 0.01 to 50% by weight based on the polymer. However, generally the surfactant concentration is within the range 1.0 to 3.0% by weight based on polymer.

The preferred surfactants are hydrophilic and are further characterized as being water-soluble. Any hydrophilic-type surfactant such as ethoxylated nonyl phenols, ethoxylated nonyl phenol formaldhyde resins, dioctyl esters of sodium sulfosuccinate, and octyl phenol polyoxyethanol can be used. Basically, any anionic, cationic or nonionic surfactant can be employed in the practice of this invention. Surfactants which could be useful in this invention are fully disclosed in U.S. Pat. 3,624,019.

After the emulsion or dispersion, diluent and surfactant have been mixed together, the resulting mixture may be applied to the treating surface in any conventional method such as a ponding technique.

After application of the mixture to the surface, the mixture is allowed to penetrate the surface. The solvent will evaporate and upon contact with water the polymer will swell. This results in the plugging of the permeable surface, resulting in a reduction in water seepage.

Example 1

This test involved filling of several 2¾ inch diameter plexiglass cylinders with a medium sand to a depth of 5 inches and treating with a 3% solids of the various emulsion-containing polymers and dispersions described above. The emulsion or dispersion was added at a rate of 25 grams cylinder. After drying, a 3 inch head of water was applied to the soil. Typical results of the test are shown in Table VI below.

TABLE VI

| Test | Treatment | Percent polymer | See page rate |
|---|---|---|---|
| 1 | None | | ½″ per hour. |
| 2 | Composition I | 3 | ½″ per day. |
| 3 | Composition III | 3 | Do. |
| 4 | Dispersion A | 3 | Do. |
| 5 | Dispersion C | 3 | Do. |

We claim:

1. A method of seepage control which comprises contacting a permeable surface with a stable liquid dispersion of a water-soluble anionic vinyl addition polymer and a water-soluble cationic polymer; said dispersion comprising:
   (A) a polymeric latex composed of a water-in-oil emulsion which contains dispersed therein a finely-divided water-soluble anionic vinyl addition polymer, said polymeric latex having uniformly distributed therethroughout; and
   (B) a water-soluble cationic polymer: with the weight ratio of (A):(B) being within the range of 1:10 to 10:1 and the total amount of (A)+(B) present within said dispersion being within the range of from 0.001 to 75% by weight.

2. A method of Claim 1 wherein the stable liquid dispersion has a weight ratio of (A):(B) within the range of from 1:5 to 5:1 and the amount of (A)+(B) present within said dispersion is within the range of from 5 to 40% by weight.

3. A method of Claim 1 wherein the stable liquid dispersion wherein the weight ratio of (A):(B) is within the range of from 1:2 to 2:1 and the amount of (A)+(B) within said dispersion is within the range of from 10 to 30% by weight.

4. The method of Claim 1 wherein the water-soluble anionic polymer is polyacrylic acid or its water-soluble salts and the water-soluble cationic polymer is an alkylene polyamine polymer.

5. A method of Claim 1 wherein said surface is earth.

6. A method of Claim 1 wherein said surfaces are drainage ditches, farm ponds, irrigation ditches or feeder canals.

7. A method of Claim 1 wherein said dispersion is diluted with a liquid organic solvent, wherein the ratio of said solvent to said emulsion is from 99:1 to 10:90.

8. A method of Claim 1 wherein the ratio of said solvent to said dispersion is from 97:3 to 60:40.

9. A method of Claim 1 wherein said dispersion is diluted with brine water, wherein the ratio of said brine water to said dispersion is 99:1 to 10:90.

10. A method of Claim 1 wherein the ratio of said brine water to said dispersion is from 97:3 to 60:40.

References Cited

UNITED STATES PATENTS

| 3,016,713 | 1/1962 | Deming | 61—1 R |
| 3,021,298 | 2/1962 | Rakowitz | 61—1 X |
| 3,298,982 | 1/1967 | Glenn et al. | 61—36 X |
| 3,580,879 | 5/1971 | Higashimura et al. | 61—36 X |
| 3,580,883 | 5/1971 | Kashara et al. | 61—36 X |
| 3,596,469 | 8/1971 | Higashimura et al. | 61—36 |
| 3,633,310 | 1/1972 | Sandiford | 61—36 X |
| 3,649,574 | 3/1972 | Cole | 61—36 X |
| 3,651,649 | 3/1972 | Najvar et al. | 61—36 |
| 3,687,200 | 8/1972 | Routson | 61—36 X |
| 3,763,072 | 10/1973 | Krieger | 61—36 X |

WILLIAM D. MARTIN, Primary Examiner

M. R. LUSIGNAN, Assistant Examiner

U.S. Cl. X.R.

61—1 R; 117—161 UB